Patented Dec. 16, 1924.

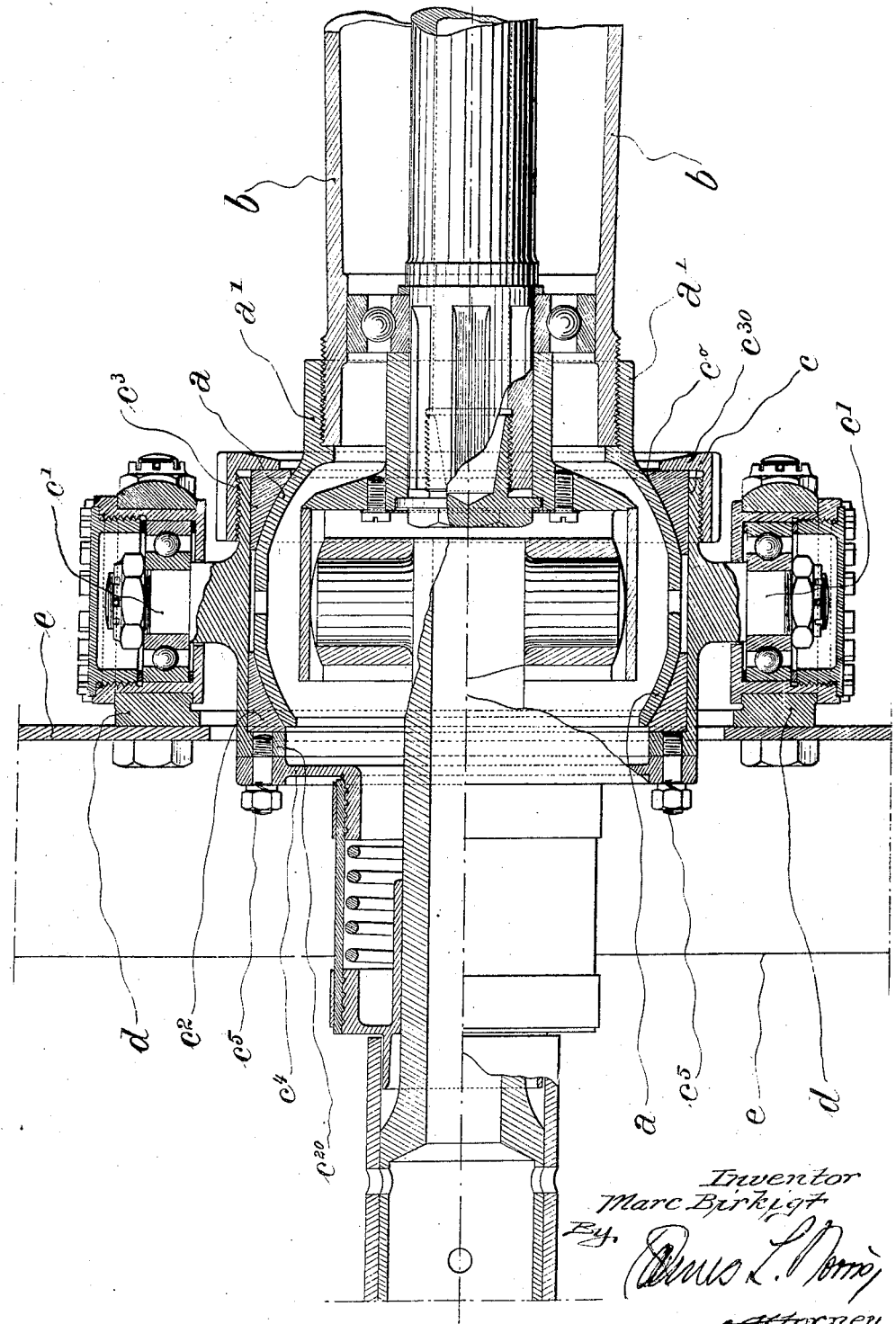

1,519,900

UNITED STATES PATENT OFFICE.

MARC BIRKIGT, OF BOIS-COLOMBES, FRANCE.

UNIVERSAL JOINT.

Application filed December 23, 1920. Serial No. 432,815.

*To all whom it may concern:*

Be it known that I, MARC BIRKIGT, engineer, citizen of the Republic of Switzerland, residing at Bois-Colombes, Department of Seine, France, have invented certain new and useful Improvements in Universal Joints, of which the following is a specification.

The invention relates to universal joints which work chiefly in one plane, and it relates more particularly to joints at the head of the torque tubes or motor cars, which torque tube, as is obvious, has to swing chiefly in a vertical plane passing through its axis.

The invention has for its object to make the said joints so that they occupy little space, and that their work takes place in better conditions.

According to this invention the socket of the joints is provided with a system of trunnions which allows the said socket to oscillate in the plane in which the said joints chiefly have to work.

Apart from this principal arrangement, it comprises certain other arrangements more explicitly described hereinafter.

The invention will be understood from the following description, and accompanying drawings, which are given by way of example. The single figure of the drawing shows in axial horizontal section, partly in plan, a head of a torque tube of a motor car, comprising a universal joint according to the invention.

The spherical casing $a$, with which the head of the torque tube is provided, is built so that it receives the various parts which are arranged in it, and in order that it may be conveniently connected to the torque tube $b$, a tubular extension $a^1$ is provided on it into which the end of the said torque tube is screwed.

The socket $c$ for the spherical casing comprises along one of its diameters a pair of trunnions $c^1$, by means of which it is mounted through the intermediary of bearings $d$, on the cross bar $e$ for supporting it and once the said mounting is done, the said socket oscillates about that of its imaginary axes which is then in the transverse position.

By the trunnioning just mentioned, the size of the opening $c^0$ is only made comparatively small because of the ball $a$ and extension $a^1$ only make a small movement in directions other than the vertical. The socket $c$ itself is only made slightly larger than the torque tube which is comparatively large, and no difficulty is experienced in the fitting of the head of the torque tube having regard to space occupied by the part intended to contain the latter.

The operation of the device is sufficiently clear from the preceding description not to require any further explanation.

The universal joint comprises at its front part an inner flange $c^{20}$ and a pair of rings $c^2$ and $c^3$ spherically recessed, so that they can enclose the front and back of the ball $a$, respectively. The rings $c^2$ are mounted in the casing so that their front face bears against the rear face of the said flange $c^{20}$.

An annular part $e^4$ is secured by means of studs $e^5$ screwed into the flange $c^{20}$ of the casing $c$, so that lubricant may be held in the mechanism.

Another annular part $c^{30}$ is screwed to the rear end of the casing $c$, for keeping the rear ring $c^3$ in place and allowing for the adjustment.

Obviously the invention is not limited to the construction described but comprises any modifications within the scope of the claims, for instance the flange $c^{20}$ studs and nuts $c^5$ and part $c^4$ may be replaced by a single annular part, substantially similar to the annular part $c^{30}$, so that the longitudinal position of the whole device may be adjusted.

Having now particularly described and ascertained the nature of my said invention and in what manner the same is to be performed, I declare that what I claim is:—

1. A pivoted support for securing a torque tube to the cross bar of the frame of an automobile, including concave and convex spherical elements, one supporting the other, one of said elements being carried by the front end of the torque tube, said elements together forming a spherical oscillatory articulation, a pair of trunnions arranged oppositely of the outer element of said articulation, bearings on said cross bar for receiving said trunnions, the later extending perpendicularly to the plane of the principal oscillations of the torque tube.

2. A pivotal support to secure the ball-shaped end of a longitudinally extending member to the cross bar of an automobile, comprising a concave shaped spherical securing element provided with two opposite externally projecting trunnions in which said ball-shaped end is journaled, the common axis of said trunnions being perpendicular to the plane of major oscillation of said longitudinally extending member and passing substantially through the center of the ball shaped end, said concave shaped spherical securing element being provided with frictional surfaces for slidably supporting said ball shaped end, anti-friction bearings within which the externally projecting trunnions are journalled whereby the friction between said ball shaped end and concave shaped securing means exceeds the friction between said trunnions and other bearings.

Dated this 5th day of December 1920.

MARC BIRKIGT.